June 11, 1940.  R. W. WAGNER  2,204,334
MOWING STRUCTURE
Filed May 8, 1939   3 Sheets-Sheet 1

INVENTOR.
ROBERT W. WAGNER
BY
ATTORNEYS

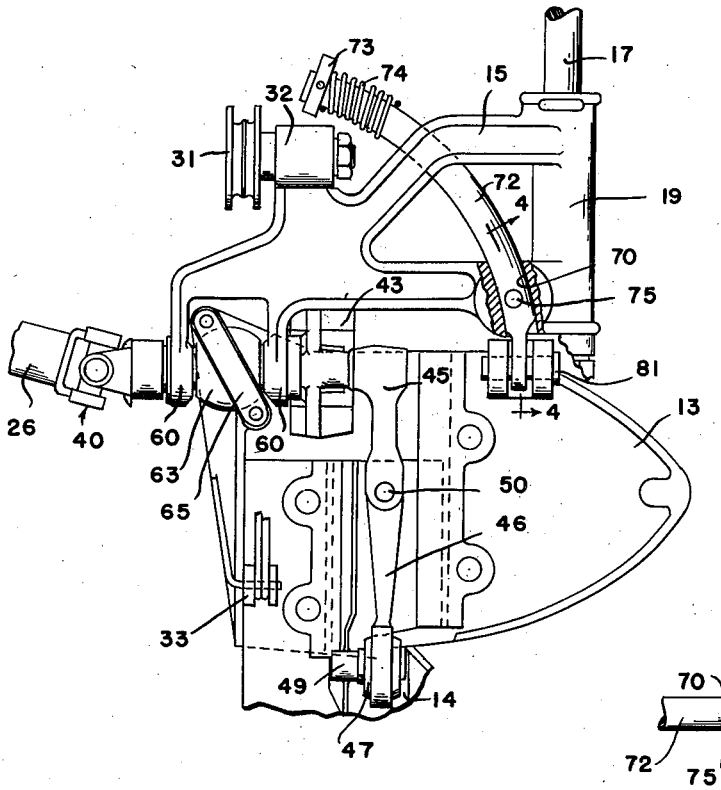
FIG. 3.
FIG. 4.
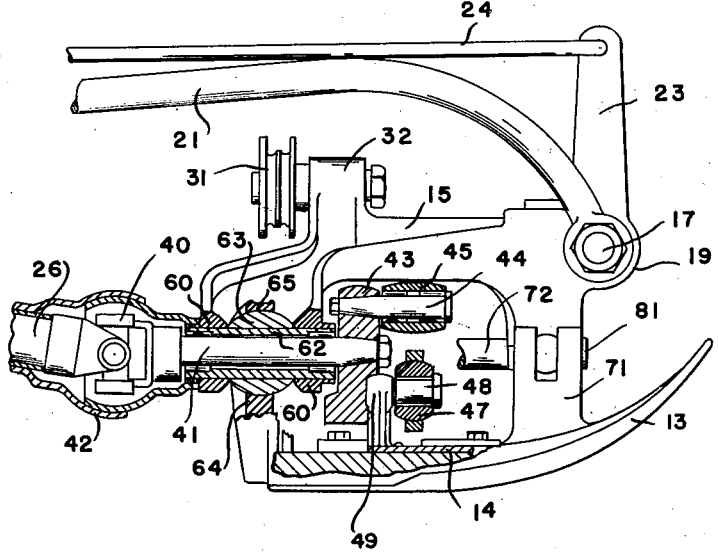
FIG. 5.
INVENTOR.
ROBERT W. WAGNER

INVENTOR.
ROBERT W. WAGNER
ATTORNEYS

Patented June 11, 1940

2,204,334

UNITED STATES PATENT OFFICE 2,204,334

MOWING STRUCTURE

Robert W. Wagner, Detroit, Mich., assignor to Detroit Harvester Company, Detroit, Mich., a corporation of Michigan Application May 8, 1939, Serial No. 272,513

15 Claims. (Cl. 56—25)

The present invention relates to a mowing structure and more particularly to a novel arrangement of the cutting mechanism particularly adapted to cooperate with a tractor mounting. This application is a continuation in part of my co-pending application, Serial No. 214,806, filed June 20, 1938, entitled "Mowing machine."

According to the present invention, mowing mechanism which comprises the mowing arm and associated cutter or sickle bar is supported for pivotal movement vertically and rearwardly in addition to being supported for bodily vertical movement.

It is also provided with means for adjusting the cutting mechanism about its longitudinal axis in order to vary the height of cut. Means are further provided for supporting a substantial part of the weight of the cutting mechanism so that while it at all times normally rests in contact with the ground it is adapted most readily to follow the contours thereof.

The mounting of the cutting mechanism for rearward swinging movement is such that the mowing mechanism is normally retained in operative position, but may readily be displaced therefrom upon encountering an unyielding object. The arrangement is such that this rearward swing of the cutting mechanism, when it occurs, does not interrupt the operative engagement between suitable drive means and the cutter, nor does it require any adjustments to return the cutting mechanism to its normal operative position.

Movement of the cutting mechanism in a vertical plane is provided so that the cutting mechanism may conform readily to various contours or slope of the ground relative to the tractor, and also for swinging the cutting mechanism to upright position when it is desired to move the tractor or mowing meachine without cutting.

Vertical bodily movement of the mowing mechanism is further provided to permit the mowing mechanism to conform most readily to any inequalities in the ground, as, for example, when one wheel of the tractor drops into a depression or when the inner end of the mowing mechanism rides over an upwardly extending portion of the terrain.

Adjustment of the mowing mechanism about its longitudinal axis is for the purpose of varying the height of cut.

With the foregoing remarks in mind, it is an object of the present invention to provide a mowing mechanism adapted to be swung rearwardly in a substantially horizontal direction from its normal operative cutting position without damage to or breakage of the arm or the associated mechanism.

It is a further object of the present invention to provide mowing mechanism comprising a mowing arm normally retained in its operative position, but adapted upon unusual strain to be swung rearwardly.

It is a further object of the present invention to provide supporting means for a mowing arm such that a mowing arm may be swung rearwardly or vertically without affecting its adjustment about its longitudinal axis.

It is a further object of the present invention to provide a mowing arm adapted to be swung rearwardly upon encounter with unusual resistance, which is restored to its normal operative position without affecting its operative connections by mechanically returning the arm to its normal position.

It is a further object of the present invention to carry the mowing arm of the mowing machine in a substantially balanced condition so that while its shoes normally rest lightly upon the ground when the arm is in operative cutting position but very little upward pressure is necessary to raise the arm.

It is a further object of the present invention to provide for tilting the mowing arm about its longitudinal axis to position the cutter in varying inclinations and thereby varying the height of cut.

Other objects of the invention will be apparent as the description proceeds, and when taken in conjunction with the accompanying drawings wherein:

Figure 3 is an enlarged plan view showing the mechanism adjacent the inner shoe of the mowing arm with parts broken away;

Figure 4 is a section on the line 4—4, Figure 3;

Figure 5 is a front elevation of the mechanism shown in Figure 3 with parts in section;

Figure 1:
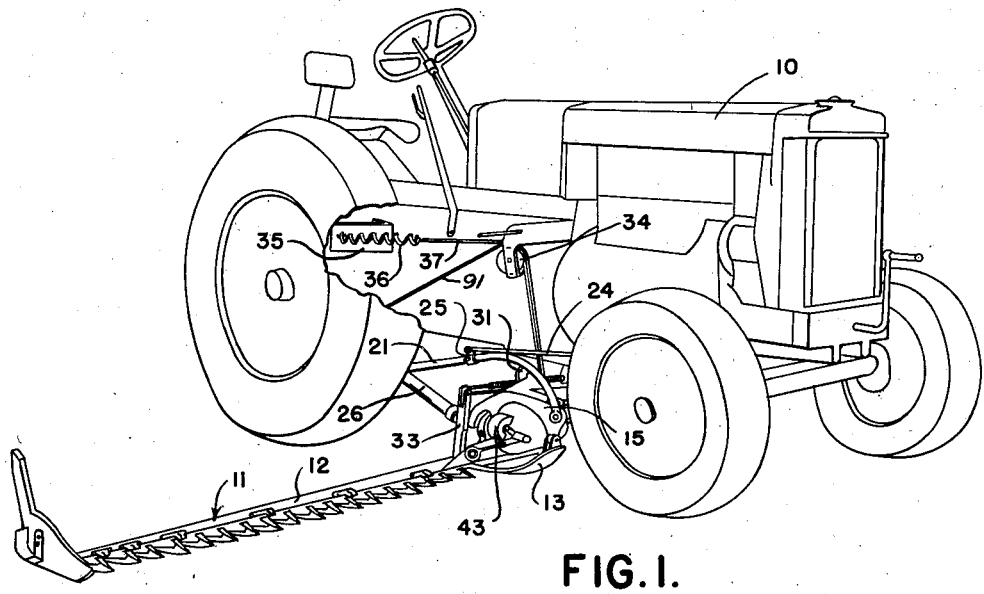
Figure 1 is a perspective view of the mowing mechanism embodying the present invention attached to a tractor.
Figure 2:
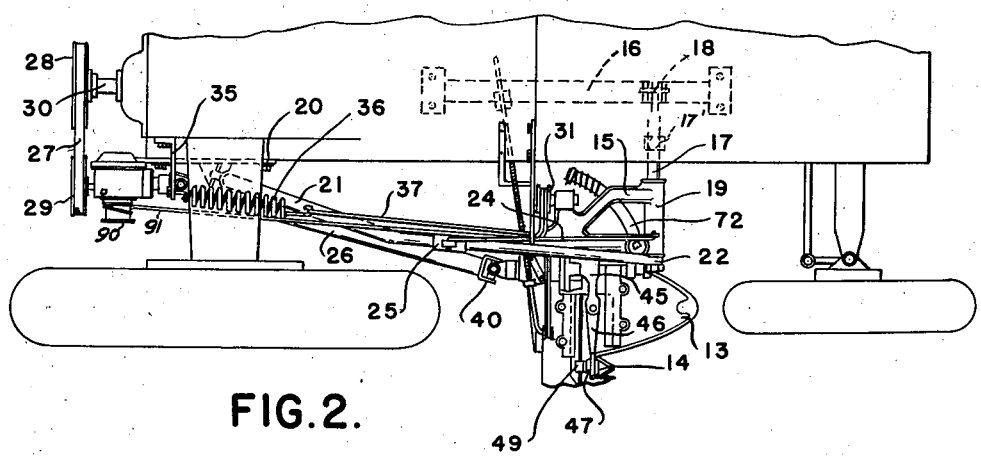
Figure 2 is a fragmentary plan view showing the mowing mechanism.

Referring first to Figures 1 and 2, I have illustrated the mowing mechanism as attached to a tractor of conventional design, indicated at 10.

The mowing mechanism indicated generally at 11 comprises a mowing arm 12 having at its inner end a shoe 13 and an associated cutter or sickle bar 14 which is reciprocably carried by the mower arm. The mowing mechanism is supported from a support or housing 15, which in turn is adjustably supported relative to the tractor by means which will now be described.

Secured to the under side of the tractor, as by a bracket 16, is a bar or rod 17 pivoted to the bracket 16 as indicated at 18. The outer free end of the rod 17 is sleeved within an appropriately shaped portion 19 of the housing 15. The arrangement is such that the housing is adjustable about the axis of the rod or shaft 17.

Adjacent the rear of the tractor is a second bracket 20 which carries a second supporting rod or shaft 21. The shaft 21 is at its free end provided with a sleeved portion 22 which receives the free end of the rod 17. As will be evident from the arrangement just described, the rod 17 is thus retained against movement except for limited movement in a vertical plane substantially about the axis of the pivot 18.

Preferably, I prefer to provide resilient means intermediate the shaft 17 and the bottom of the tractor for urging the shaft 17 downwardly about its pivot point 18 and for preventing the rod from coming into abrupt contact with the bottom of the tractor. This means may conveniently take the form of a compression spring interposed between suitable guiding studs located respectively on the rod 17 and the bottom of the tractor as indicated at 17'. This arrangement is shown in my copending application Serial No. 214,806, filed June 20, 1938, and is therefore not illustrated in detail here.

In order to provide for initial adjustment of the mowing mechanism about its transverse axis, I provide on the housing 15 a preferably integrally formed upwardly projecting arm 23, best seen in Figure 5. A short rod section 24 is connected at one end to the arm 23 and at the other end to a bracket 25 which is adjustably clamped to the rod 21 previously referred to. As will be evident, adjustment of the rod section 24 by a shifting of the clamp 25 will result in a pivotal adjustment of the housing 15 about the axis of the rod 17. This adjustment will result in a corresponding variation of the height of cut of the mowing mechanism, as will be readily apparent.

Referring again to Figure 2, suitable power take-off mechanism from the prime mover of the tractor is provided, and includes a drive shaft 26 suitably connected as by means of a belt 27 and pulleys 28 and 29 to the primary shaft 30 of the power take-off. Preferably, the power transmission includes suitable speed reducing and clutch mechanism which forms no part of the present invention.

As previously stated, the entire mowing assembly is suitably balanced so as to be readily responsive to the contours of the terrain. For this purpose the housing 15 is provided with a sheave 31 supported from a suitable bracket 32 formed on or attached to the housing 15. The mower arm 12 has rigidly secured thereto a vertical arm 33. Carried by the tractor is a second sheave 34, and a bracket indicated at 35 is secured to the side of the tractor adjacent the rear thereof. A tension spring 36 is secured to the bracket 35 and has secured to its free end a cable 37 which is led over the sheave 34, under the sheave 31 and attached at its end to the upper free end of the arm 33. As will be evident, the effect of the cable 37 and the spring 36 is to support a portion of the weight of the inner end of the mowing mechanism 11 through the sheave 31 and in addition to support a portion of the weight of the outer end of the mowing mechanism through the agency of the upwardly extending arm 33.

In order to transmit power from the drive shaft 26 to the cutter, appropriate mechanism is provided, which will now be described. This mechanism is best illustrated in Figures 3 to 5 and includes a power transmitting universal joint indicated generally at 40 which connects the drive shaft 26 to a secondary drive shaft 41. The working parts are provided with suitable housing means 42. Secured to the opposite end of the shaft 41 within the housing 15 is a fly wheel 43 provided with a crank 44 projecting therefrom. As seen in Figure 3, crank 44 is connected to the cutter bar 14 by the medium of an articulated linkage comprising a first link 45 journaled on the crank pin 44 and a second link 46 which is provided with a universal connection to a spherically formed bearing member 47. Member 47 is journaled on a pin 48 carried by a bracket 49, which in turn is rigidly supported from the cutter 14. Links 45 and 46 are pivoted together for relative movement about a vertical axis, as indicated at 50.

The mowing mechanism 11 is supported relative to the housing 15 for vertical or horizontal swinging movement. In order to provide these two phases of movement and at the same time to prevent relative axial displacement between the mowing mechanism 11 and the housing, I provide the following arrangement of parts: The housing 15 is provided with a pair of spaced arms 60 having registering apertures to receive a tubular bushing 62 for the shaft 41. Received between the arms 60 and surrounding the bushing 62 is a spherically formed bearing member 63. The shoe 13 at the inner end of the mowing arm 12 is provided with means embracing the spherically formed member 63. This means takes the form of a lower bracket 64 and an upper cap bracket 65 adapted to be bolted together and suitably formed on their interior to engage the spherically formed member 63 snugly. By this arrangement the shoe 13 and mowing arm 12 are thus pivoted for universal adjustment about the center of the spherically formed member 63. It is desired to limit this universal adjustment however to a rearward and upward swinging movement and to prevent positively any axial displacement of the mowing arm relative to the housing 15. For this purpose, an arcuate recess 70 is formed in a portion of the support 15, the center of curvature of the arcuate opening being the center of the spherically formed member 63. The shoe 13 is provided with an upwardly extending bracket 71 to which is secured an arcuate rod 72 which passes through the arcuate opening 70. The rod 72 is preferably provided at its free end with a rigid abutment 73 and a suitable cushioning spring 74 to take up shock when the mowing arm is swung rearwardly. Suitable means are provided for normally retaining the arm in its forward or normal operative position, and these means are illustrated in Figure 4 and take the form of a suitable recess 75 formed in the upper surface of the rod 72, and a corresponding spring pressed detent 76 suitably retained in the housing 77 formed as a part of the housing support 15. As seen in Figure 4, the spring pressed detent 76 is provided with an integrally formed lower shoulder 78 against which abuts a compression spring 79. The opposite end of the spring pressed detent 76 is guidingly received within an annular closure member 80, which also serves as a spring retainer. As will be readily evident, the spring pressed detent 76 is normally engaged in the recess 76 and prevents rearward swinging of the mowing mechanism during normal operation. In the event, however, that the mowing arm encounters an immovable object, the detent 76 is forced upwardly, and swinging movement of the mowing arm takes place about the center of the spherically shaped member 63. During this movement the arcuate rod 72 serves to guide and support the mowing arm and at the same time prevents the relative axial displacement previously referred to.

Rearward swinging movement of the mowing mechanism is permitted without injury to or displacement of any of the operative parts by reason of the articulated connection between the crank 44 and the cutter 14. As will be readily evident, in order to restore the mowing machine to its normal operating condition, it is necessary only to return the mowing arm to its normal laterally extending position. This may be done manually or more conveniently by simply reversing the tractor for a sufficient distance until the arm snaps back into its resiliently locked position.

In order to permit the upward swinging of the mowing arm 12, previously referred to, a pivotal connection is provided, indicated at 81, to the bracket 71. This pivot connection, it should be noted, is in axial alignment with the center of the spherically formed portion 63. As a result of this the mowing arm may be swung vertically about an axis which coincides with the axis of the pivot connection 81 and which passes through the center of the spherical portion 63. A power lift for the mower arm 12 is provided, which is described in detail in my prior copending application Serial No. 214,806. Briefly reviewed, this comprises a power driven drum 90 which winds a cable 91. The cable 91 is secured to vertical arm 33, previously described, and passes over sheave 34 and under sheave 31, also previously described. Rotation of the drum 90 rotates the arm 33 in a clockwise direction (Figure 1) lifting the mower arm 12, as will be readily apparent.

The mechanism thus far described provides for all of the movements initially referred to. Vertical movement of the supporting housing 15 is provided by reason of sufficient play in the connections between the shafts 17 and 21. This vertical displacement of the housing support 15 is of limited extent and no particular provisions need be taken therefor, the arrangement of the parts previously described permitting such movement.

Figure 6:
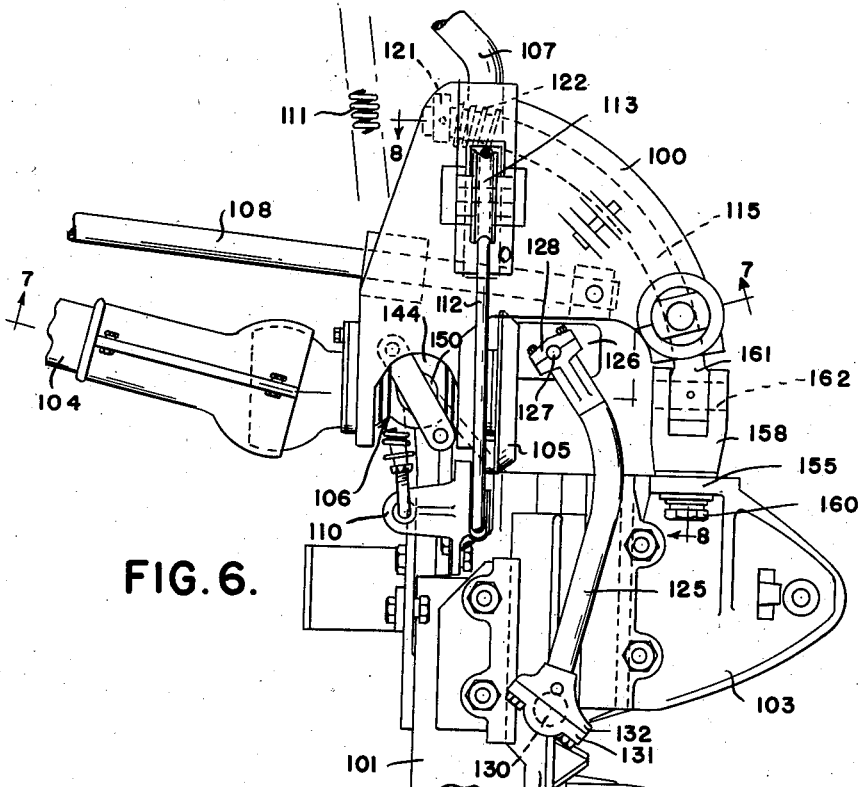
Figure 6 is a view corresponding to Figure 3 but illustrating a modified construction.
Figure 7:
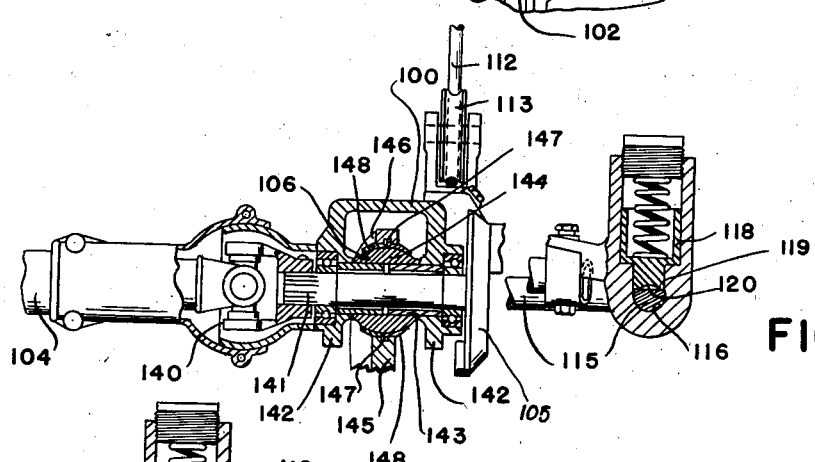
Figure 7 is a section on the line 7—7, Figure 6.
Figure 8:
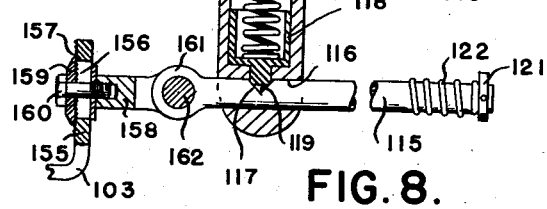
Figure 8 is a section on the line 8—8, Figure 6.

Referring now to Figures 6 to 8, I have illustrated a somewhat different embodiment of my invention. Since this embodiment differs only in certain details, it will not be described completely, reference being had to the description of Figures 1 to 5 for corresponding parts, which are unchanged. In this embodiment, I have illustrated the supporting housing at 100, the mowing arm at 101, the cutter or sickle bar at 102, the inner shoe at 103, the drive shaft at 104, the fly wheel at 105, the spherically formed connection between the housing support 100 and the mowing arm 101 at 106, and the supporting rods corresponding to the rods 17 and 26 in Figure 3 at 107 and 108, respectively.

An upwardly projecting arm 110 is provided adjacent the inner end of the mowing arm to which is secured a tension spring 111 connected at its opposite end to a suitable bracket carried by the tractor. Tension of the spring 111 acting on the upper end of the arm 110 (which corresponds to the arm 33 in Figure 1) tends to swing the outer end of the mowing arm 101 upwardly and thereby balances a portion of its weight. A cable 112 is also secured to the arm 110 and passes under a sheave 113 carried by the supporting housing 100. Cable 112 is secured to a suitable pulley mechanism driven from the power take-off of the tractor. This arrangement forms no part of the present invention.

As in the preceding embodiment, the mowing arm 101 is retained against displacement about its longitudinal axis relative to the housing support 100 by means of an arcuate rod 115. The rod 115 passes through a corresponding arcuately formed aperture 116, as shown in Figure 8. The aperture 116 and the rod 115 are both concentric with the center of the spherical bearing member 106. Suitable spring pressed detent means are arranged for the purpose of normally holding the mowing arm in its operative laterally extending position, said means being operable upon unusual resistance to permit rearward swinging of the mowing mechanism. I have illustrated in Figures 7 and 8 an improved form of spring pressed detent for performing this function. As seen in these figures, the rod 115 is provided with a V-shaped notch 117 and the spring pressed detent 118 comprises a cup member having a corresponding V-shaped knife-edge 119. As best seen in Figure 7, the knife edge 119 is provided with a transverse arcuate recess 120 of the same radius and curvature as the rod 115. By means of this, injury to the knife edge and excessive wear thereof is substantially prevented. Upon encountering unusual resistance the mowing arm 101 swings rearwardly displacing the spring pressed detent 118 upwardly. The provision of the arcuate recess 120 provides substantially unrestricted rearward swinging of the mowing arm, inasmuch as by this means a scraping action of a knife edge over the upper curved surface of the rod 115 is prevented.

In the present embodiment of my invention I have provided improved means for connecting the fly wheel 105 and the cutter bar 102. It will be recalled that in the embodiment previously described I employ an articulated linkage. I have found that satisfactory results are obtained by employing a connecting rod such as illustrated at 125 in Figure 6. A crank pin (not shown in this figure) has sleeved thereon a member 126 which is in turn provided with a pair of diametrically opposed trunnion bearings 127. Connecting rod 125 is provided with a removable cap 128 which cooperates with the connecting rod to receive the trunnion bearings 127 therebetween. As will be evident, this arrangement permits relative swinging about a vertical axis between connecting rod 125 and the sleeve 126.

The opposite end of the connecting rod 125 is connected to a projection 130 carried by the cutting bar 102. Preferably, the projection 130 is spherically formed and the connecting rod 125 is provided with a cooperating bearing assembly comprising a removable cap 131 adapted to cooperate with a correspondingly recessed member 132 rigidly secured to the connecting rod 125.

In order to provide the necessary clearance between the connecting rod 125 and the associated mechanism upon rearward swinging of the mowing arm 101, the connecting rod 125 is bowed as indicated in Figure 6. The amount of bow is just sufficient to provide adequate clearance upon maximum rearward swinging of the mowing arm 101.

Referring now to Figure 7, I illustrate a somewhat different embodiment of the spherical bearing which forms the primary support for the mowing arm. The shaft 108 is connected through a suitable torque transmitting universal connection 140 to a secondary shaft 141 which in turn is received between plates 142 preferably formed integrally with the supporting housing 100. A bushing 143 is received in corresponding registering apertures in the plates 142 and is adapted to receive the shaft 141 therein. On the exterior of the bushing 143 is a spherically formed bearing member 144. The shoe 103 at the inner end of the mowing arm 101 is provided with a bracket member 145 adapted to embrace the lower portion of the spherically formed member 144, and a removable cap 146 cooperates therewith to clamp the spherically formed member 144 therebetween. As best seen in Figure 7, members 145 and 146 are provided with interior grooves 147 which are adapted to receive correspondingly formed flanges of intermediate bearing members 148. By this means the bearing members 148 are retained in position. The bearing members 148 are provided adjacent the top and bottom thereof, as best seen in Figure 6, with laterally extending projections 150 which are spherically shaped to conform to the spherical member 144. By this provision increased bearing is obtained between spherical member 144 and the embracing members 145 and 146.

The arcuate rod 115 is provided with an abutment 121 and a buffer member in the form of a coil spring 122. The arrangement is such that the abutment 121 limits the amount of rearward swinging of the mowing arm and the coil spring 122 serves to take up the shock in the event that the mower arm is swung rearwardly to the limit of its movement.

As best seen in Figure 8, arcuate rod 115 is provided with adjustable supporting means so that the pivot connection of the arcuate rod may be properly aligned with the spherical bearing 106. As best seen in Figure 8, the shoe 103 is provided with a vertically extending projection 155 to which is secured the arcuate rod 115. For this purpose the projection 155 is provided with a vertically extending slot 156 and the outer surface of the projection 155 is serrated as indicated at 157. Bifurcated bracket 158 is bolted to the projection 157 by means of a correspondingly serrated washer 159 and bolt 160. The bracket 158, as best seen in Figure 6 is adapted to receive the eye 161 of the rod 115, a pin 162 being provided to supply the necessary pivot connection. It is necessary for proper operation of the parts that the pin 162 shall be positioned so that its axis coincides with the center of the spherical bearing 106. Vertical adjustment of the bifurcated member 158, as previously described, permits proper alignment of parts.

In the present modification the operation is substantially the same as in the previously described embodiment. The housing support 100 is mounted by means of the rods 107 and 108 for limited substantially vertical movement and is further mounted for adjustment about a transverse horizontal axis by means (not shown) similar to the adjusting rod 24 shown in Figure 5. In addition, the mowing mechanism has a primary universal connection with the housing support in the form of a spherical bearing 106 which of itself would permit universal adjustment between the mowing mechanism and the housing support. This universal adjustment is limited to horizontal and vertical swinging movement by means of the arcuate rod 115 and a correspondingly formed arcuate recess in the housing support, vertical swinging movement being permitted by the pivot connection formed between the arcuate rod 115 and the bracket 158. The mowing arm is partly counterbalanced by means of the spring 111 so that it may readily follow uneven contours of the ground. Rearward swinging movement of the mowing mechanism is freely permitted without destroying the operative connections and the mowing mechanism may be restored to normal operating position by mechanically moving the arm back to its normal position where it will be retained by the spring pressed detent 118.

While I have illustrated and described two specific embodiments of my invention, it will be apparent to those skilled in the art that various additions, modifications, omissions, combinations and substitutions may be made which will be within the spirit and scope of my invention as defined by the appended claims.

What I claim as my invention is:

1. In a mowing machine, a support having a spherically shaped mounting thereon, a mowing shoe having means embracing said mounting to provide relative universal adjustability between said support and said shoe, a bracket carried by said shoe and vertically adjustable relative thereto, an arcuate member secured to said bracket and extending horizontally about the center of said mounting, said support having an aperture receiving said arcuate member in guiding relation.

2. In a mowing machine, a support, a mowing shoe pivoted to said support for rearward swinging movement, an arcuate member carried by said shoe and extending horizontally about the pivot axis of said shoe, said support having an aperture for receiving said arcuate member, said arcuate member being notched, a spring pressed detent carried by said support, and having an edge engageable in said recess, the edge of said detent being recessed to conform to the cross section of said arcuate member.

3. In a mowing machine, a support, a mowing arm having an inner shoe mounted on said support, a sickle bar on said mowing arm, a universal pivot connection between said shoe and said support, a crank shaft extending through said pivot connection, a crank carried by said shaft, a second pivot connection between said shoe and said support arranged to permit rearward swinging of said mower arm, and a pitman connecting said crank and said sickle bar, said pitman being bowed to permit said rearward swinging of said arm.

4. In a moving machine, a support, a mowing arm having an inner shoe mounted on said support, a sickle bar on said mowing arm, a universal pivot connection between said shoe and said support, a crank shaft extending through said pivot connection, a crank carried by said shaft, a second pivot connection between said shoe and said support arranged to permit rearward swinging of said mower arm, and a pitman connecting said crank and said sickle bar, said pitman being bowed to permit said rearward swinging of said arm, said crank being located between said pivot connections.

5. In a mowing machine, a support, a mowing arm having an inner shoe mounted on said support, a sickle bar on said mowing arm, a universal pivot connection between said shoe and said support, a crank shaft extending through said pivot connection, a crank carried by said shaft, a second pivot connection between said shoe and said support arranged to permit rearward swinging of said mower arm, and a pitman connecting said crank and said sickle bar, said pitman being bowed to permit said rearward swinging of said arm, said pitman being connected to said crank for relative pivoting about an axis perpendicular to the axis of said crank shaft.

6. A mowing machine having a mowing arm extending laterally therefrom, a pivot support for said arm permitting rearward swinging of said arm, a crank shaft extending through said support, a sickle bar on said arm, a crank pin on said crank shaft, and a pitman connecting said pin and bar, said pitman being bowed and pivoted to said crank pin for relative movement about a vertical axis to permit rearward swinging of said arm.

7. In a mowing machine, a support having a spherically shaped mounting thereon, a mowing arm having means embracing said mounting to provide relative universal adjustability between said support and said arm, a bracket carried by said arm for vertical adjustment relative thereto, an arcuate member pivoted to said bracket, the pivot axis between said bracket and member passing adjacent the center of said mounting, said support having an aperture receiving said arcuate member in guiding relation.

8. In a mowing machine, a tractor having a motor, a housing supported from said tractor for substantially vertical swinging movement relative thereto, a mower shoe having a universal connection with the housing, a mower arm secured to the shoe, a sickle bar carried by the arm, and a driving connection between the tractor motor and sickle bar including a crank shaft extending axially of the universal connection, and a connecting rod terminally connected to the crank shaft and sickle bar, said rod being curved longitudinally to embrace the universal connection aforesaid upon movement of the mower arm in a predetermined direction relative to said housing.

9. In a mowing machine, a tractor, a housing supported from said tractor for substantially vertical swinging movement relative thereto, a mower shoe having a universal connection with the housing, a mower arm secured to the shoe, and means normally holding the shoe and arm against rearward swinging movement relative to said housing but operable when said arm strikes an obstruction to permit such rearward movement, including a bracket carried by said shoe and vertically adjustable relative thereto, and an arcuate arm slidable in the housing in concentric relation to the universal connection and pivotally connected to said vertically adjustable bracket.

10. In a mowing machine, a tractor, a housing supported from said tractor for vertical swinging movement relative thereto, said housing having laterally spaced portions, a mower shoe having a universal connection with one of said portions and having a combined pivotal and sliding connection with the other of said portions, the pivotal connection including a part adjustable vertically relative to said shoe.

11. In a mowing machine, a tractor, a housing supported from said tractor for vertical swinging movement relative thereto, said housing having laterally spaced portions, a mower shoe having a universal connection with one of said portions, and a connection between the shoe and the other of said portions including two pivotally connected elements, one of said elements being adjustable vertically relative to the shoe, the other of said elements slidably engaging the housing.

12. In a mowing machine, a tractor, a housing supported from said tractor for vertical swinging movement relative thereto, said housing having laterally spaced portions, a mower shoe having a universal connection with one of said portions, a connection between the shoe and the other of said portions including two pivotally connected elements, one of said elements being adjustably connected to the shoe, the other of said elements slidably engaging the housing, and means carried by the housing for yieldably retaining the slidable element against sliding movement.

13. In a mowing machine, a tractor, a housing adjustably supported from the tractor, a spherical member carried by the housing, a mower shoe mounted on the spherical member for both horizontal and vertical swinging movement, a mower bar carried by the shoe, means for swinging the shoe and bar vertically, and means controlling horizontal swinging movement of the shoe and bar including two pivotally connected members, one being adjustably connected to the shoe, and the other being slidably connected to the housing.

14. In a mowing machine, a tractor, a housing adjustably supported from the tractor, a mower shoe having a universal connection with the housing, a mower bar carried by the shoe, and means controlling movement of the shoe in one direction relative to the housing including two pivotally connected members, one being adjustably connected to the shoe, the other slidably engaging the housing, and a yieldable detent carried by the housing and engaging the slidable member.

15. In a mowing machine, a tractor, a housing supported from said tractor, and a mower shoe having laterally spaced connections with the housing, one being a universal connection, and the other being a combined pivotal and sliding connection, the pivotal connection including a part adjustable relative to the shoe.

ROBERT W. WAGNER.